June 24, 1930. A. M. TROGNER 1,766,565
ELECTRICAL CONDENSER
Filed Dec. 16, 1926  2 Sheets-Sheet 1
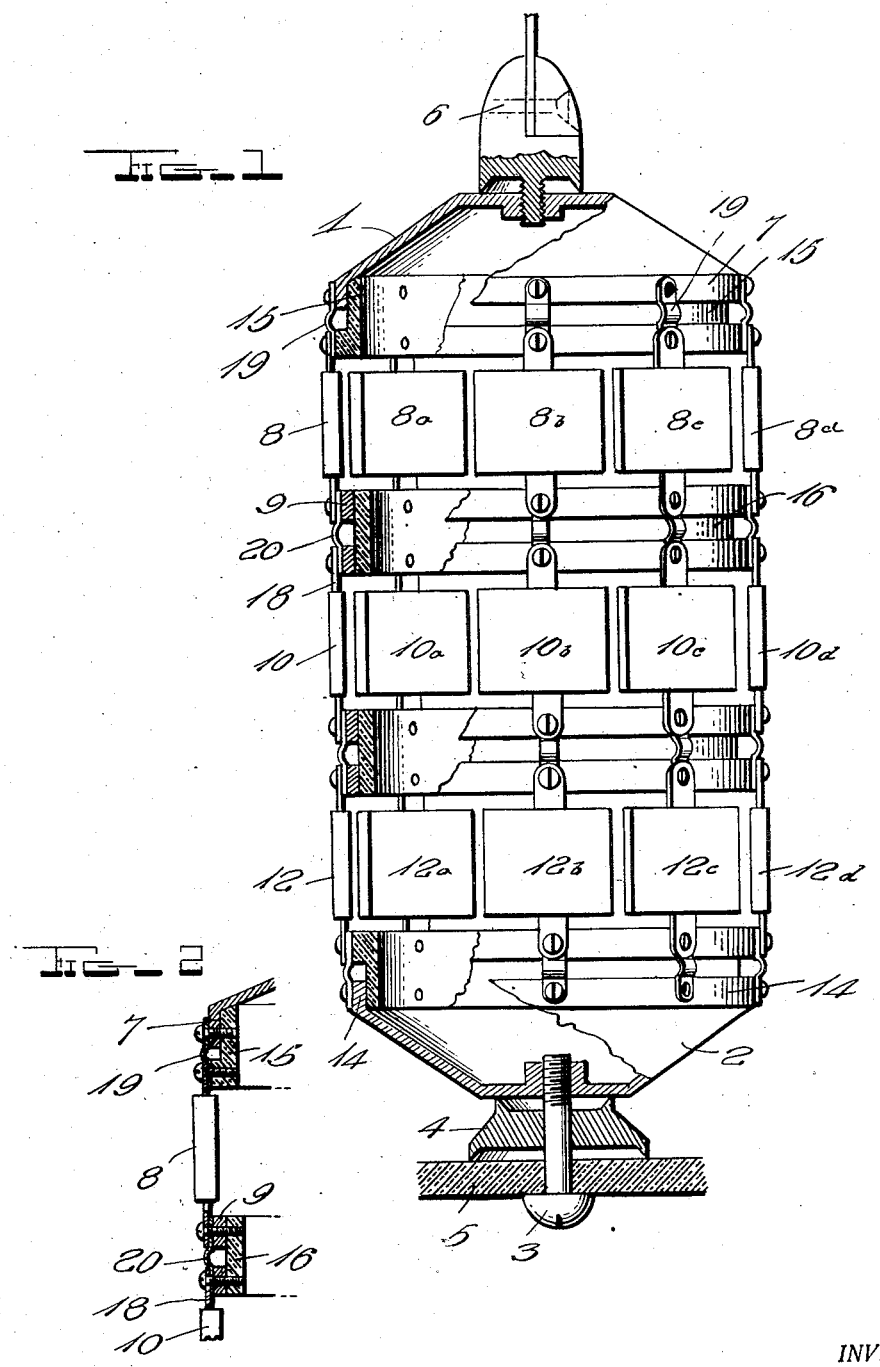
INVENTOR.
Arthur M. Trogner,
BY
ATTORNEY

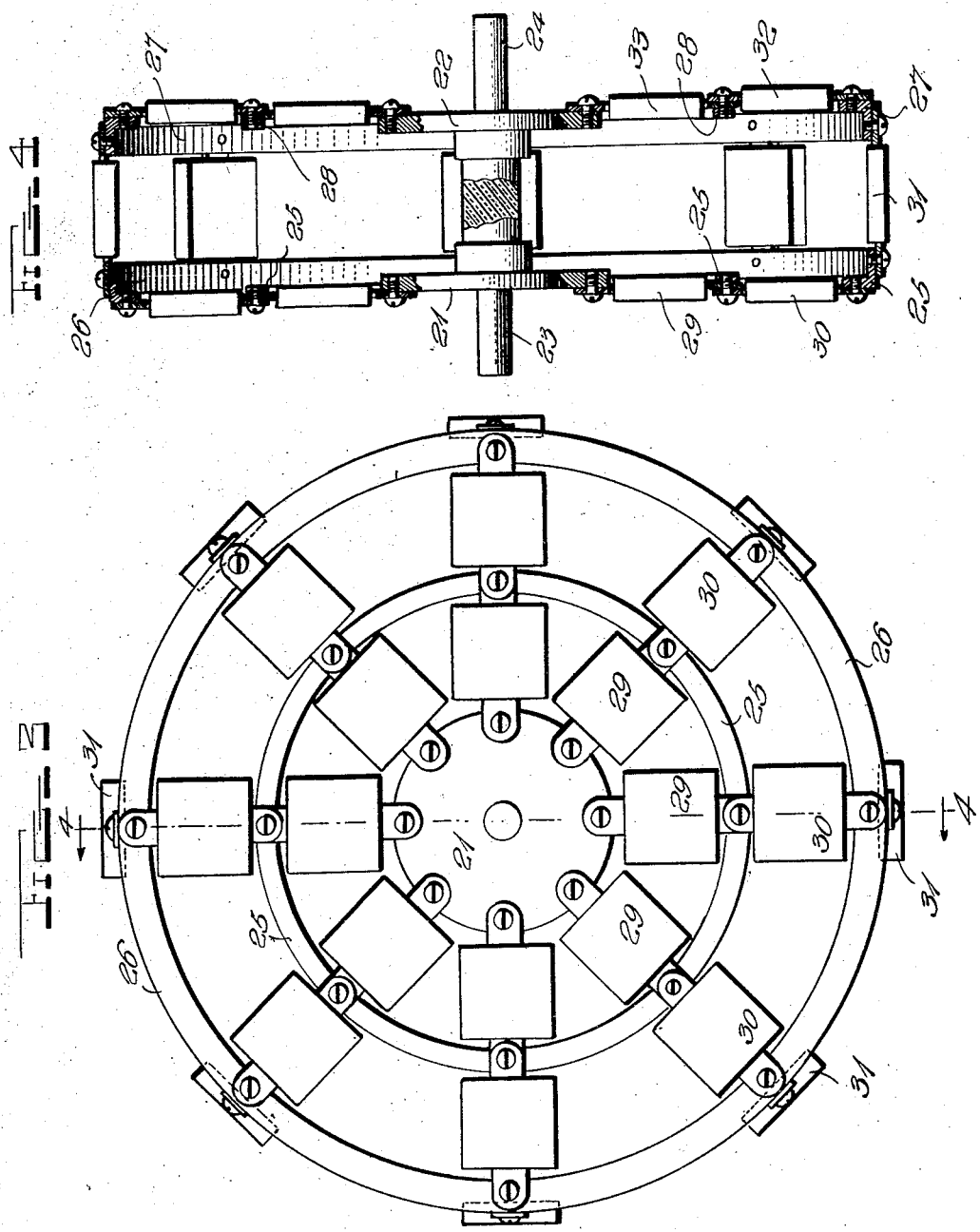

Patented June 24, 1930

1,766,565

UNITED STATES PATENT OFFICE

ARTHUR M. TROGNER, OF TAKOMA PARK, MARYLAND, ASSIGNOR, BY MESNE ASSIGNMENTS, TO FEDERAL TELEGRAPH COMPANY, A CORPORATION OF CALIFORNIA

ELECTRICAL CONDENSER

Application filed December 16, 1926. Serial No. 155,223.

My invention relates broadly to electrical condensers and more particularly to a condenser construction particularly adapted for high frequency transmission systems.

One of the objects of my invention is to provide a construction of electrical condenser of small physical size but high electrical capacity for high frequency operation with a high degree of efficiency.

Another object of my invention is to provide a construction of high frequency condenser constituted by a plurality of independent condenser units connected in parallel paths and arranged in such manner that the inductive reactance of each parallel path is maintained substantially equal.

Another object of my invention is to provide a construction of high frequency electrical condenser in which a plurality of individual fixed condenser units are arranged in parallel and connected between equalizing conductor members in such manner that inequalities in resistance and capacity of the units may be compensated and the condenser operated at high efficiency with minimum losses.

Still another object of my invention is to provide a construction of high frequency condenser made up of a plurality of parallel connected fixed condenser units where individual units may be readily removed or replaced, or in the event of puncture and subsequent short circuit means are provided for effectively excluding the condensers from the circuit.

A still further object of my invention resides in the construction of a high frequency condenser where the total capacity is obtained by means of the assembly of a plurality of fixed condenser units which are air-cooled and not subject to dielectric losses normally existent by the close association of a case which normally may be filled with insulating material.

Other and further objects of my invention will be understood from the specification hereinafter following by reference to the accompanying drawings wherein:

Figure 1 illustrates the assembly of a high frequency electrical condenser constructed in accordance with my invention, the condenser assembly being partially broken away and illustrated in cross-section for more adequately disclosing the invention; Fig. 2 illustrates a modified mounting for the individual condenser units of the condenser system where each condenser is protected by fuses for automatically removing the condenser from the circuit in the event of puncture; and Figs. 3 and 4 show modified constructions of high frequency condensers embodying the principles of my invention.

In connection with the design of high frequency transmitters great difficulty has been experienced in obtaining fixed condensers which will carry the currents required and stand up under the voltages applied in sets of more than ½ to 1 k. w. rating. At these frequencies the containing cases and wax fillers used in the conventional designs of condensers introduce losses which are prohibitive unless the condensers are made excessively large and expensive. The construction of condenser in accordance with my invention makes use of small commercial condenser units in proper series-parallel arrangement.

In arranging condenser units in parallel for operation on high frequencies it is very important that the inductive reactance of each of the parallel paths be kept as nearly equal as practicable. In the form of condenser system of my invention this is accomplished in one form by placing the small units in the plane of a cylinder with common terminals at the ends coaxial with the cylinder and in a modified form by distributing part of the condensers radially out from one terminal and others radially into the second terminal. Each form has its advantages for certain uses.

(a) Symmetrical arrangement insures equal current through all condensers if of same capacity value. No condensers working under overload.

(b) Equalizing strips or rings serve to redistribute voltage and current to make up for any small inequalities in resistance and capacity of units.

(c) Open unit construction does away with expensive container and wax fillers and eliminates losses caused by presence of case and filler.

(d) Open construction also provides for ready removal of any condenser units which may become damaged.

(e) More efficient natural cooling provided.

(f) Each individual condenser unit may be fused to automatically remove it from the circuit in case of puncture.

(g) Condenser system is less expensive and physically smaller in size than condensers of equivalent capacity heretofore available.

Referring to the drawing in detail reference character 1 designates the top hood for a high frequency condenser. Reference character 2 designates the lower hood for the condenser and between these hoods there are arranged a plurality of fixed condenser units connected in parallel. The condenser assembly may be supported from an insulated base 5 by means of pedestal 4 and screw threaded member 3. The hood 2 forms one terminal of the condenser system, while hood 1 with the central projecting terminal 6 in the top thereof provides the opposite terminal of the condenser system. The condenser assembly may be supported from a metallic frame such as the frame of the transmitter or the parts 3 and 4 may be replaced by a terminal similar to member 6 and the condenser suitably suspended from opposite ends. Hood 1 is provided with an annular skirt depending therefrom while hood 2 is provided with an upwardly extending annular skirt 14. Fixed condenser units 8, $8^a$, $8^b$, $8^c$ and $8^d$ have their terminals connected to the skirt 7 and depend downwardly therefrom with the opposite sides of the condensers connected to the equalizing ring member 9. Another set of fixed condenser units connect to the terminals of the first set of fixed condenser units in the equalizing ring 9 as represented at 10, $10^a$, $10^b$, $10^c$ and $10^d$, and the lower terminals of these fixed condenser units connect to the equalizing ring member 11 to which the terminal of another set of fixed condenser units such as represented by condensers 12, $12^a$, $12^b$, $12^c$ and $12^d$ are connected. The lower terminals of this last set of fixed condensers are anchored to the annular skirt 14 of the conductive hood 2.

In order to provide for the automatic removal of a fixed condenser unit from the condenser system in the event of puncture, I have shown in Fig. 2 the arrangement of a system of fuses which may be interposed between opposite ends of the several condenser units and the terminal hoods 1 and 2. For this purpose I provide within the annular skirt 7 of hood 1 an insulated ring member 15, which provides a support for the condensers 8—$8^d$ with fuse members 19 interposed between the upper terminals of condenser 8 and the conductive hood 1. A similar insulating ring member 16 is provided in association with the equalizing ring 9, which provides a support for fuse member 20 which interconnect the upper terminals 18 of condensers 10—$10^d$ by means of fuses 20. In the event of puncture an individual condenser unit may be automatically removed from the circuit while the high frequency current is conducted through the remaining active condenser units in the system.

In the modified condenser system such as illustrated in Figs. 3 and 4 the condenser units are arranged in radial formation between the conductive circular discs 21 and 22 each having opposed terminals 23 and 24. An insulated pedestal member 35 may be provided between the conductive terminal discs 21 and 22. Concentric equalizer ring members 25, 26, 27 and 28 are provided between which sets of parallel connected condensers 29, 30, 31, 32 and 33 are connected. The individual condenser units may be readily removed and replaced and any tendency for unequal distribution of the high frequency current, due to small inequalities in resistance and capacity of the units, is compensated for by the equalizing rings. An arrangement of fuses similar to the construction illustrated in Fig. 2 may be provided and the mounting of each condenser is such that the condenser units can be readily detached from or inserted upon the equalizing rings. The entire assembly of condenser units is such that cooling air may be circulated around the condenser units for maintaining the temperature of the condenser units at constant value.

The arrangement of the condenser units is symmetrical which insures equal current through all of the condenser units if of the same capacity value. None of the condenser units are worked under overload and the tendency of the equalizing rings to redistribute the voltage and current to compensate for small inequalities in resistance and capacity of the units insures the operation of a high frequency condenser system at high efficiency.

While I have described my invention in certain preferred embodiments, I desire that it be understood that modifications may be made and no limitations upon my invention are intended other than are imposed by the scope of the appended claims.

What I claim as new and desire to secure by Letters Patent of the United States is as follows:

1. A high frequency system comprising a frame structure having a plurality of equalizing conductive ring members and a plurality of fixed condenser units of substantially the same capacity symmetrically arranged between said equalizing conductive ring members forming a substantially hollow cylindrical frame whereby high frequency current may be distributed through said frame structure while compensating for inequalities in resistance and capacity of said condenser units and terminals positioned at opposite ends of said frame structure and connected with the ring members adjacent the extremities of said frame structure.

2. A high frequency condenser system comprising a frame structure, terminals at opposite ends of said frame structure, a plurality of equalizing ring members disposed at separated points between said terminals and a plurality of sets of individually encased fixed condenser units of substantially the same capacity connected between said equalizing ring members and said terminals and arranged on the exterior limits of said frame structure for distributing high frequency current through said condenser system while compensating for inequalities in resistance and capacity of said condenser units.

3. A high frequency condenser system comprising a frame structure having terminal members at opposite ends of the frame structure, a plurality of equalizing ring members disposed between said terminals and a plurality of sets of individually encased fixed condenser units connected between said terminal members and operating to mechanically support each other and said equalizing ring members, said condenser units being aligned one with another on the exterior limits of said frame structure and providing a plurality of equal paths for the distribution of high frequency current between said terminal members while compensating for small inequalities in resistance and capacity of said condenser units.

4. A high frequency condenser system comprising a frame structure having terminal members at opposite ends thereof, a plurality of intermediate conductive equalizing ring members disposed between said terminal members, a plurality of independent condenser units, said condenser serving to mechanically support said conductive equalizing ring members and to mutually support each other and said ring members operating to compensate for small inequalities in resistance and capacity of said condenser units said condensers all lying in planes coincident with the exterior limits of said frame structure.

5. A high frequency condenser system comprising a pair of terminal members, a plurality of conductive equalizing ring members, a plurality of sets of fixed condenser units disposed between said terminal members and said conductive equalizing ring members, said ring members and fixed condenser units conjointly forming a closure having a substantially hollow interior, said condenser units having their centers disposed in planes passing through the axes of said terminal members and serving to mechanically support said conductive ring members while said conductive ring members provide lateral paths between said condenser units for compensating for inequalities in resistance and capacity of said condenser units.

6. An electrical condenser comprising a plurality of fixed condenser units, upper and lower frame members forming substantially a hollow enclosure and means for detachably mounting said fixed condenser units on said upper and lower frame members remote from the hollow interior thereof for establishing a plurality of independent electrical circuits through said condenser, said condenser units each being readily renewable by similar condensers under conditions of break down of a particular condenser.

7. A high frequency condenser system comprising a frame structure, terminal members at opposite ends of the frame structure, conductive equalizing ring members disposed intermediate said terminal members, sets of fixed condenser units connected between said terminal members and said conductive equalizing ring members, condenser units in selected sets being aligned one with respect to another and connected end to end in planes passing through the axis of said frame structure, said condenser units serving to mechanically support said conductive equalizing ring members with respect to said terminal members while said conductive equalizing ring members compensate for inequalities in the electrical characteristics of said condenser units and provide a plurality of paths for the distribution of high frequency current between said terminal members.

8. A high frequency electrical condenser system comprising a pair of terminal members, a plurality of equalizing conductive ring members disposed between said terminal members, sets of fixed condenser units connected between said terminal members for supporting said conductive equalizing ring members, fusible connectors disposed between said terminal members and each of said fixed condenser units and between the abutting terminals of said fixed condenser units whereby defective condenser units may be automatically eliminated from the high frequency condenser system while high frequency current is redistributed in a plurality of paths through said high frequency condenser system.

ARTHUR M. TROGNER.